United States Patent

Ueda et al.

Patent Number: 5,958,609
Date of Patent: Sep. 28, 1999

[54] ORGANIC ELECTROLUMINESCENCE DEVICE

[75] Inventors: Masato Ueda, Tsukuba; Fumi Yamaguchi, Tsuchiura, both of Japan

[73] Assignee: Sumitomo Chemical Co., Ltd., Osaka, Japan

[21] Appl. No.: 08/787,353

[22] Filed: Jan. 22, 1997

[30] Foreign Application Priority Data

Jan. 24, 1996 [JP] Japan ..................... 8-010423

[51] Int. Cl.⁶ .................................. H05B 33/14
[52] U.S. Cl. .................. 428/690; 428/917; 313/503; 313/504; 313/506
[58] Field of Search .................. 428/690, 917; 313/503, 504, 506

[56] References Cited

PUBLICATIONS

Suzuki et al., 'Behavior of Charge Carriers and Excitons in Multilayer Organic Light–Emitting Diodes Made from a Polysilane Polymer as Monitored with Elctroluminescence', Journal of Applied Physics, vol. 79, No. 2, pp. 858–865 (Jan. 1996).
Patent Abstracts of Japan, vol. 017, No. 394 (C–1088), Jul. 21, 1993 & JP 05 070772 A.
Database WPI, Section Ch, Week 9502, Derwent Publications Ltd., London, GB, Class E11, AN 95–009629.

*Primary Examiner*—Charles Nold
*Attorney, Agent, or Firm*—Pillsbury Madison & Sutro Intellectual Property Group

[57] ABSTRACT

An organic electroluminescence device which has a pair of electrodes, at least one of which is transparent or semitransparent, and at least one organic layer formed between the electrodes. The organic layer contains a hole transporting material and a light emitting material in the same or different layer. The hole transporting material contains at least one polysilane whose main chain skeleton is composed of a repeating unit represented by the general formula (1) and a repeating unit represented by the general formula (2):

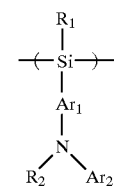

(1)

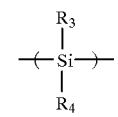

(2)

wherein $R_1$, $R_2$, $R_3$ and $R_4$ independently represent a substituted or unsubstituted alkyl group, a substituted or unsubstituted cycloalkyl group, a substituted or unsubstituted aryl group or a substituted or unsubstituted aralkyl group, $Ar_1$ represents a substituted or unsubstituted arylene group and $Ar_2$ represents a substituted or unsubstituted aryl group. The polysilane satisfies the expression $0.2 \leq z \leq 1$ where a ratio of the number of the repeating unit (1) and that of the repeating unit (2) to the total number of the repeating units (1) and (2) are z and 1–z, respectively. The polysilane has a weight average molecular weight of not less than 5000 and a hole drift mobility of $10^{-3}$–$10^{-1}$ cm²/v/sec. The organic EL device shows excellent characteristics of higher luminance and higher luminous efficiency at lower driving voltage.

7 Claims, No Drawings

ORGANIC ELECTROLUMINESCENCE DEVICE

BACKGROUND OF THE INVENTION

Field of the Invention

The present invention relates to an organic electroluminescence device (hereinafter sometimes referred to as an "organic EL device") which is used for a flat light source, a display device and the like. More particularly, it relates to an organic EL device having a hole transporting material containing a polysilane.

Description of Related Art

An inorganic electroluminescence device (hereinafter sometimes referred to as an "inorganic EL device") using an inorganic light emitting substance as a light emitting material is used as a flat light source for backlight of liquid crystal display or a display device such as flat panel display and the like, however, high A.C. voltage was required for driving the devices.

Recently, Tang et al. has made an organic EL device having a two-layer structure wherein an organic fluorescent dye as a light emitting layer and an organic hole transporting material used as a xerographic photoreceptor are laminated, thereby realizing a low-voltage drive organic EL device having high luminous efficiency and high luminance (U.S. Pat. No. 4,539,507, Japanese Patent Kokai (Laid-open) No. 59-194393).

The organic EL device has merits that emission of lights of various colors can be easily obtained in comparison with the inorganic EL device, in addition to low-voltage drive and high luminance. Therefore, a lot of experiments about device structures, organic hole transporting materials and organic fluorescent dyes have been reported [Jpn. J. Appl. Phys., Vol. 27, page L269 (1988); J. Appl. Phys., Vol. 65, page 3610 (1989)].

The organic EL device is composed of a structure wherein an organic light emitting material is interposed between a pair of opposing electrodes. Electrons are injected from one electrode and holes are injected from the other electrode. When these injected electrons and holes are recombined at the light emitting material, light emission arises.

The hole transporting layer has a function of making it easy to inject holes from a positive electrode, and a function of easily transporting holes due to large hole drift mobility and blocking electrons due to small electron drift mobility, thereby increasing a recombination probability in the light emitting layer. Therefore, a hole transporting material having high hole drift mobility is required so as to obtain a low-voltage drive organic EL device having high luminous efficiency and high luminance.

As the hole transporting material used for the hole transporting layer, organic photoconductors having low molecular weight have hitherto been used. Those having the hole drift mobility of about $10^{-3}$ cm$^2$/V/sec have been known and considerably high luminance was obtained. However, there are problems that the resultant has low durability and lacks in stability because the organic photoconductor is liable to be crystallized by heat generation and the production cost becomes high because films are formed by vacuum deposition.

It is also possible to use a dispersion prepared by dispersing an organic photoconductor having low molecular weight in a resin such as poly(carbonate), as the material used for the hole transporting layer. In this case, the cost is low because a film is formed by coating or casting, however, the hole drift mobility becomes low and the luminance does not become high.

Poly(N-vinylcarbazole) (hereinafter sometimes abbreviated to "PVCZ") is known as the high-molecular weight material having hole transporting properties and it is disclosed that a device obtained by laminating PVCz as the hole transporting material and a fluorescent dye (coumarin 7) as the light emitting material dispersed in a polymer emits green light (Japanese Patent Kokai (Laid-Open) No. 4-2096).

Furthermore, a device obtained by laminating PVCz as the hole transporting material and tris(8-quinolinol) aluminum as the light emitting material is disclosed (Japanese Patent Kokai (Laid-Open) No. 3-190088). In this case, the cost is low because a PVCz film can be formed by coating or casting, and crystallization due to heat generation does not easily arise. However, the hole drift mobility is drastically low such as $10^{-6}$ cm$^2$/V/sec and, therefore, the luminous efficiency and luminance are not sufficient and the driving voltage is also high.

A polysilane comprising silicon as a main skeleton has attracted special interest recently. The polysilane is not only soluble in organic solvents and excellent in film-forming properties, but has also such characteristics as a semiconductor. The holes are conducted by the transfer of electrons delocalized through the silicon-silicon linkage of the main chain, so that polysilane has become expected as an organic semiconductor (Physical Review B, Vol. 35 (1987), page 2818).

It is known that the hole drift mobility of poly(methylphenylsilane) is the highest among polymeric materials and reaches about $10^{-4}$ cm$^2$/V/sec at room temperature (about 25° C.). However, a single polysilane having the hole drift mobility of not less than $10^{-3}$ cm$^2$/V/sec has never been reported.

It is disclosed in Japanese Patent Kokai (Laid-Open) No. 2-204996 that a polysilane, which has hitherto been known, is used for the hole transporting layer of the organic EL device. However, the hole drift mobility of the polysilane is lower than that of a vacuum deposited film of the organic photoconductor having low molecular weight and, therefore, the luminance is not necessarily sufficient.

SUMMARY OF THE INVENTION

An object of the present invention is to solve the above-described problems of a conventional organic EL device, thereby providing an organic EL device having characteristics such as higher luminance and higher luminous efficiency at lower driving voltage.

In accordance with the present invention, it has been found that an organic EL device having lower driving voltage, higher luminance and higher luminous efficiency can be obtained by using a polysilane whose hole drift mobility was improved by introducing an arylaminoarylene group into the side chain, as the hole transporting material.

In summary, the present invention relates to an organic electroluminescence device having a pair of electrodes, at least one of which is transparent or semitransparent, and at least one organic layer formed between the electrodes. The organic layer contains a hole transporting material and a light emitting material in the same or different layer, wherein the hole transporting material contains a polysilane whose main chain skeleton is composed of a repeating unit represented by the following general formula (1):

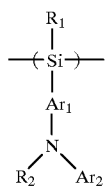

(1)

(wherein $R_1$ and $R_2$ independently represent a substituted or unsubstituted alkyl group, a substituted or unsubstituted cycloalkyl group, a substituted or unsubstituted aryl group, or a substituted or unsubstituted aralkyl group, $Ar_1$ represents a substituted or unsubstituted arylene group and $Ar_2$ represents a substituted or unsubstituted aryl group) and a repeating unit represented by the following general formula (2):

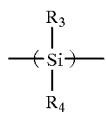

(2)

(wherein $R_3$ and $R_4$ independently represent a substituted or unsubstituted alkyl group, a substituted or unsubstituted cycloalkyl group, a substituted or unsubstituted aryl group, or a substituted or unsubstituted aralkyl group), and the polysilane satisfying the expression $0.2 \leq z \leq 1$ where a ratio of the number of the repeating unit (1) and that of the repeating unit (2) to the total number of the repeating units (1) and (2) are z and 1−z, respectively, the polysilane having a weight-average molecular weight of not less than 5000 and a hole drift mobility of $10^{-3}$–$10^{-1}$ cm$^2$/V/sec.

The invention also relates to the above organic electroluminescence device according to wherein a polysilane of the general formula (1) in which $R_2$ is a substituted or unsubstituted phenyl group, $Ar_1$ is a substituted or unsubstituted phenylene group and $Ar_2$ is a substituted or unsubstituted phenyl group is used.

The invention also relates to the above organic electroluminescence device having a pair of electrodes, at least one of which is transparent or semitransparent, and at least one organic layer formed between the electrodes. The organic layer contains a hole transporting material and a light emitting material in the same or different layer, wherein the organic layer contains, as the light emitting material, at least one kind of a polymeric fluorescent substance which has fluorescence in the solid state and contains at least one kind of a repeating unit represented by the following formula (3):

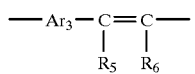

(3)

(wherein $Ar_3$ represents an arylene group having 4 to 20 carbon atoms, which takes part in a conjugated bond, or a heterocyclic compound group, and $R_5$ and $R_6$ independently represent a group selected from the group consisting of hydrogen, an alkyl group having 1 to 20 carbon atoms, an aryl group having 6 to 20 carbon atoms, a heterocyclic compound group having 4 to 20 carbon atoms and a cyano group), the sum of the above repeating units being not less than 50% by mol of the total number of the repeating units, a number-average molecular weight of the polymeric fluorescent substance being $10^3$–$10^7$.

The invention also relates to the above organic electroluminescence device, wherein a hole transporting layer containing at least one kind of the polysilane and a light emitting layer are laminated each other.

The invention also relates to the above organic electroluminescence device according to wherein a hole transporting layer containing at least one kind of the polysilane, a light emitting layer and an electron transporting layer are laminated.

The invention also relates to the above organic electroluminescence device having at least one organic layer which contains a hole transporting material containing at least one kind of the polysilane and a light emitting material.

The invention also relates to the above organic electroluminescence device having at least one organic layer which contains a hole transporting material containing at least one kind of the polysilane, a light emitting material and an electron transporting material.

DETAILED DESCRIPTION OF THE INVENTION

The organic EL device of the present invention comprises a pair of electrodes, at least one of which is transparent or semitransparent, and at least a hole transporting material and a light emitting material are interposed between the electrodes, the hole transporting material containing a polysilane having a specific structure.

As the substituted or unsubstituted arylene group $Ar_1$ of the arylaminoarylene group as the side chain of the polysilane used for the hole transporting material of the organic EL device of the present invention, an arylene group having 6 to 24 carbon atoms is preferred and examples thereof include substituted or unsubstituted phenylene group, substituted or unsubstituted naphthylene group, and substituted or unsubstituted anthrylene group. Among them, the substituted or unsubstituted phenylene group is particularly preferred.

As the substituted or unsubstituted aryl group $Ar_2$ in the arylaminoarylene group as the side chain, an aryl group having 6 to 24 carbon atoms is preferred and example thereof include substituted or unsubstituted phenyl, group, substituted or unsubstituted naphthyl group, and substituted or unsubstituted anthryl group. Among them, the substituted or unsubstituted phenyl group is particularly preferred.

As $R_2$ in the arylaminoarylene group as the side chain, a substituted or unsubstituted straight-chain or branched alkyl group having 1 to 10 carbon atoms, a substituted or unsubstituted cycloalkyl group having 10 or less carbon atoms, a substituted or unsubstituted aryl group having 6 to 24 carbon atoms or a substituted or unsubstituted aralkyl group having 7 to 26 carbon atoms is preferred. Among them, the substituted or unsubstituted aryl group having 6 to 24 carbon atoms is preferred and the substituted or unsubstituted phenyl group is particularly preferred.

Examples of the alkyl group include methyl group, ethyl group, n-propyl group, isopropyl group, n-butyl group, sec-butyl group, tert-butyl group, pentyl group, hexyl group, octyl group, dodecyl group and the like. Examples of the cycloalkyl include cyclohexyl group and the like. Examples of the aryl group include phenyl group, naphthyl group, anthryl group and the like. Examples of the aralkyl group include benzyl group, phenethyl group, p-methylbenzyl group and the like.

As the substituent of the substituted or unsubstituted arylene group $Ar_1$, the substituted or unsubstituted aryl group $Ar_2$ and the substituted or unsubstituted alkyl group, substituted or unsubstituted cycloalkyl group, substituted or unsubstituted aryl group, or substituted or unsubstituted aralkyl group for $R_2$, a straight-chain or branched alkyl group having 1 to 6 carbon atoms or a cycloalkyl having 6 or less carbon atoms is preferred, and examples thereof include methyl group, ethyl group, n-propyl group, isopropyl group, n-butyl group, sec-butyl group, tert-butyl group, pentyl group, hexyl group, cyclohexyl group and the like.

Specific examples of the arylaminoarylene group as the side chain of the repeating unit represented by the general formula (1), which is a feature of the polysilane of the present invention, will be described below, but are not limited thereto. In the formula, $R_1$ to $R_7$ independently represent a methyl group, an ethyl group, an n-propyl group, an isopropyl group, an n-butyl group, a sec-butyl group, a tert-butyl group, a pentyl group, a hexyl group or a cyclohexyl group. In addition, n represents an integer of 0 to 2, o represents an integer of 0 to 3, p represents an integer of 0 to 4, and q represents an integer of 0 to 5.

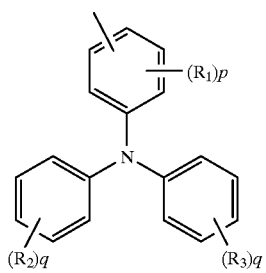

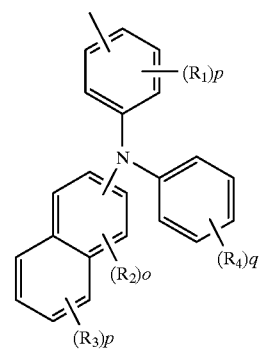

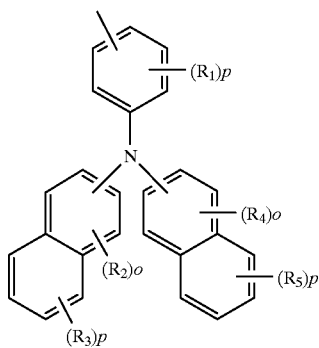

-continued

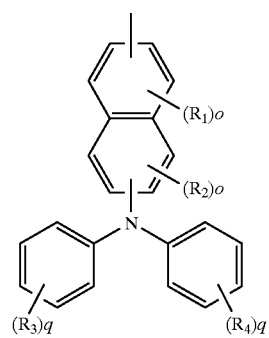

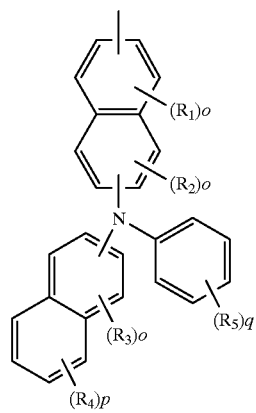

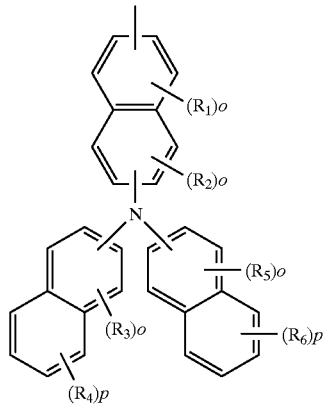

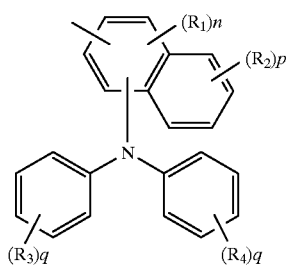

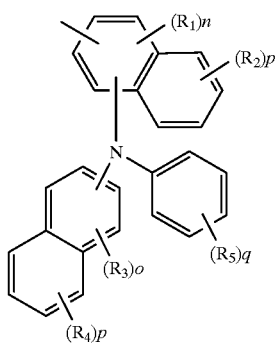

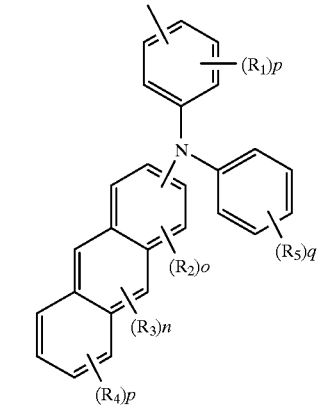

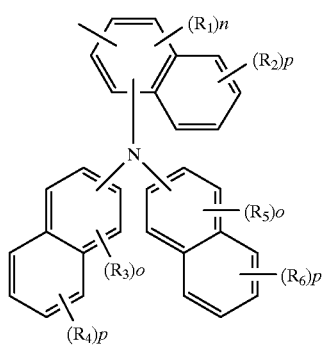

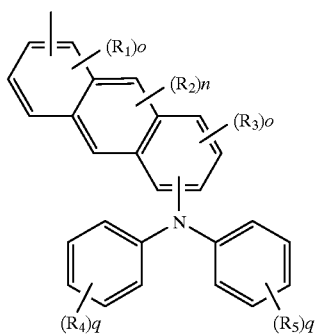

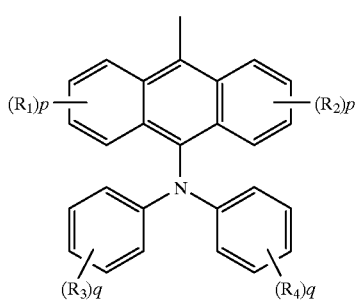

As the side chains $R_1$, $R_3$ and $R_4$ other than the arylaminoarylene group in the polysilane used for the hole transporting material of the organic EL device of the present invention, a substituted or unsubstituted straight-chain or branched alkyl group having 1 to 10 carbon atoms, a substituted or unsubstituted cycloalkyl group having 10 or less carbon atoms, a substituted or unsubstituted aryl group having 6 to 24 carbon atoms or a substituted or unsubstituted aralkyl group having 7 to 26 carbon atoms is preferred, independently.

Examples of the alkyl group include methyl group, ethyl group, n-propyl group, isopropyl group, n-butyl group, sec-butyl group, tert-butyl group, pentyl group, hexyl group, octyl group, dodecyl group and the like. Examples of the cycloalkyl include cyclohexyl group and the like. Examples of the aryl group include phenyl group, naphthyl group, anthryl group and the like. Examples of the aralkyl group include benzyl group, phenethyl group, p-methylbenzyl group and the like.

Examples of the substituent of the substituted or unsubstituted alkyl group, substituted or unsubstituted cycloalkyl group, substituted or unsubstituted aryl group, and substituted or unsubstituted aralkyl group include straight-chain or branched alkyl group having 1 to 6 carbon atoms or cycloalkyl group having 6 or less carbon atoms, and examples thereof include methyl group, ethyl group, n-propyl group, isopropyl group, n-butyl group, sec-butyl group, tert-butyl group, pentyl group, hexyl group, cyclohexyl group and the like.

When the ratio of the number of the repeating unit (1) and that of the repeating unit (2) to the total number of the repeating units (1) and (2) of the polysilane used for the hole transporting material of the organic EL device of the present invention are z and 1–z, respectively, z satisfies the expression $0.2 \leq z \leq 1$, preferably $0.5 \leq z \leq 1$, more preferably $z=1$.

The weight-average molecular weight of the polysilane used for the hole transporting material of the EL device of the present invention is not less than 5000, preferably not less than 10000, more preferably not less than 100000. When the weight-average molecular weight is less than 5000, the moldability as a feature of the polymer is drastically lowered.

The hole drift mobility of the polysilane used for the hole transporting material of the EL device of the present invention is from $10^{-3}$ to $10^{-1}$ cm$^2$/V/sec. When the hole drift mobility is less than $10^{-3}$ cm$^2$/V/sec, the desired high-level light emitting characteristics of the present invention can not be accomplished.

The polysilane used for the hole transporting material of the EL device of the present invention can be synthesized by the method known as Kipping method, e.g. method described in Journal of Organometallic Chemistry, Vol. C27 (1980), page 1980; or Journal of Polymer Science: Polymer Chemistry Edition, Vol. 22 (1984), page 159.

That is, it can be obtained by bringing a dihalosilane monomer represented by the following general formula (4) or a mixture of dihalosilane monomers represented by the following general formulas (4) and (5) into contact with an alkali metal in an inert solvent under a high-purity inert atmosphere obtained by removing oxygen and water content, e.g. high-purity argon gas atmosphere.

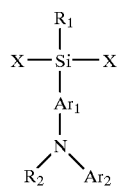

(4)

(wherein X represents a halogen atom, and R$_1$, R$_2$, Ar$_1$ and Ar$_2$ are as defined in the above general formula (1)).

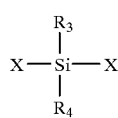

(5)

(wherein X represents a halogen atom, and R$_3$ and R$_4$ are as defined in the above general formula (2)).

As the halogen atom of the dihalosilane monomer, bromine and iodine atoms can be used, in addition to most popular chlorine. As the alkali metal, lithium, sodium, potassium and an alloy thereof can be used. These alkali metals are used to the reaction in the molten state or in the form of a dispersion of fine particles.

The inert solvent may be a solvent which can dissolve the dihalosilane monomer and is inert to the alkali metal and dihalosilane monomer. For example, there can be used aromatic hydrocarbons such as toluene, xylene, benzene and the like; aliphatic hydrocarbons such as dodecane, heptane, hexane, cyclohexane and the like; and ether solvents such as diethyl ether, tetrahydrofuran, tetrahydropyran, diethylene glycol dimethyl ether and the like.

The condensation reaction can be carried out at a temperature between room temperature and the boiling point of the solvent, or at a temperature between room temperature and 100° C. where the boiling point of the solvent is above 100° C. The reaction time is not specifically limited, and is preferably within the range from 15 minutes to 24 hours in industrial view of point.

The dihalosilane monomer having various substituents, which can be supplied to the Kipping method, can be synthesized according to a known synthesis method. That is, it can be obtained by a metathesis reaction using alkyltrichlorosilane or tetrachlorosilane, which is industrially produced by a well-known direct method, a Grignard reagent as an organic compound and a lithium salt, or a hydroxylation reaction between hydrosilane and olefin or an acetylene compound.

The structure of the organic EL device of the present invention may be any one which includes a hole transporting material containing the above-described polysilane and a light emitting material between a pair of electrode composed of a positive electrode and a negative electrode, at least one of which is transparent or semitransparent, and is not specifically limited. Therefore, any layered structure can be employed. Alternatively, various modification canbemade without departing from the spirit of the present invention.

Examples of the layered structure include:
(1) electrode (positive electrode)/hole transporting layer/light emitting layer/electrode (negative electrode),
(2) electrode (positive electrode)/hole transporting layer/light emitting layer/electron transporting layer/electrode (negative electrode),
(3) electrode (positive electrode)/(mixed layer of hole transporting material and light emitting material)/electrode (negative electrode), and
(4) electrode (positive electrode)/(mixed layer of hole transporting material, light emitting material and electron transporting material)/electrode (negative electrode). The structure (1) is referred to as a two-layer structure and the structure (2) is referred to as a three-layer structure, respectively. The organic EL device of the present invention has these structures as a basic structure. In addition to the above structures, the organic EL device of the present invention may have a structure obtained by combining these structures (1) to (4) or have a plurality of the respective layers. The shape, size, material and production process of the organic EL device of these layered structure of the present invention are appropriately selected according to applications of the organic EL device, and are not specifically limited.

The light emitting material used for the organic EL device of the present invention is not specifically limited, and various materials can be applied. A fluorescent dye and a polymeric fluorescent substance are preferred, and the polymeric fluorescent substance is more preferred.

The low molecular weight organic compound is not specifically limited, for example, there can be used naphthalene and a derivative thereof, anthracene and a derivative thereof, perylene and a derivative thereof, poly(methylene)

and a derivative thereof, xanthene and a derivative thereof, coumarin and cyanine dyes and a derivative thereof, 8-hydroxyquinoline and a metal complex of a derivative thereof, aromatic amine and a derivative thereof, tetraphenylcyclopentadiene and a derivative thereof, tetraphenylbutadiene and a derivative thereof and the like. Specifically, known low molecular weight organic compounds described in Japanese Patent Kokai (Laid-Open) Nos. 57-51781 and 59-194393 can be used.

The polymeric fluorescent substance which can be used as the light emitting material is not specifically limited, and examples thereof include poly(phenylenevinylene) and a derivative thereof, poly(arylene) and a derivative thereof, poly(alkylthiophene) and a derivative thereof, poly(alkylfluorene) and a derivative thereof and the like. Among these polymers, poly(phenylenevinylene) and a derivative thereof are preferred.

Hereinafter, the polymeric fluorescent substance used as the light emitting material of the organic EL device of the present invention will be explained.

The polymeric fluorescent substance is a polymer containing the repeating unit represented by the general formula (3) in the amount of not less than 50% by mol of the total number of the repeating units. Although it varies depending on the structure of the repeating unit, the amount of the repeating unit represented by the general formula (3) is not less than 70% by mol of the total number of the repeating units, more preferably. The polymeric fluorescent substance may contain a divalent aromatic compound group or a derivative thereof, a divalent heterocyclic ring compound group or a derivative thereof and a group obtained by combining them, as the repeating unit other than the repeating unit represented by the general formula (3). The repeating unit represented by the general formula (3) or the other repeating unit may be connected with a non-conjugated unit having an ether, ester, amide or imide group, or a conjugated moiety thereof may be contained in the repeating unit.

In the polymeric fluorescent substance of the present invention, $Ar_3$ of the general formula (3) is an arylene group having 4 to 20 carbon atoms, which takes part in a conjugated bond, or a heterocyclic compound group. Examples thereof include a divalent aromatic compound group or a derivative group thereof, a divalent heterocyclic compound group thereof or a derivative group thereof, as shown below, a group obtained by combining them and the like.

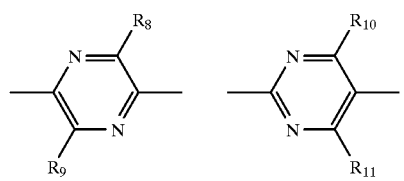

-continued

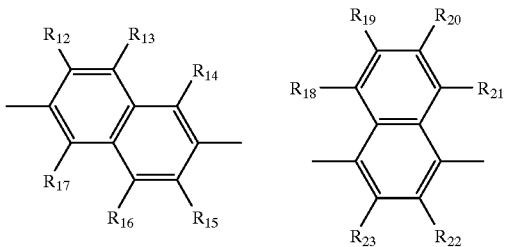

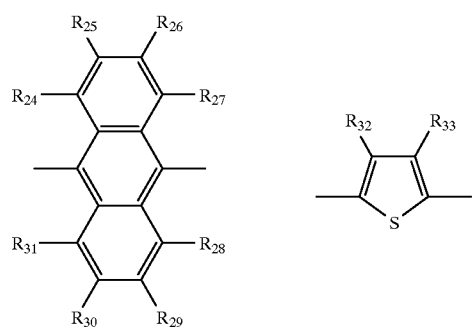

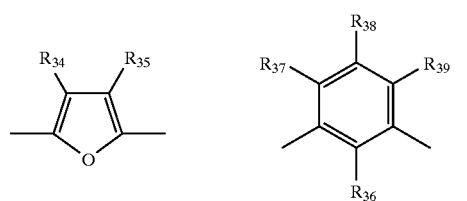

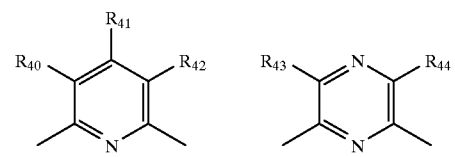

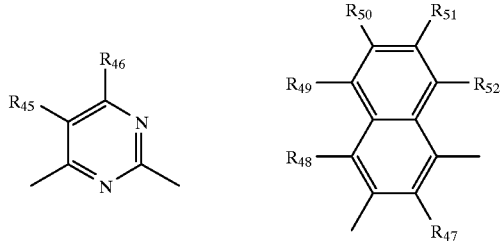

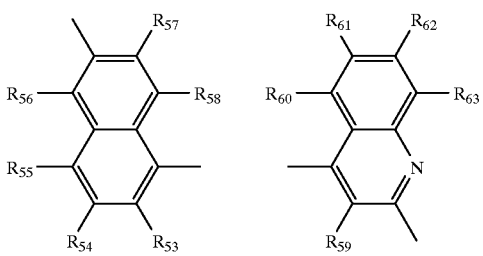

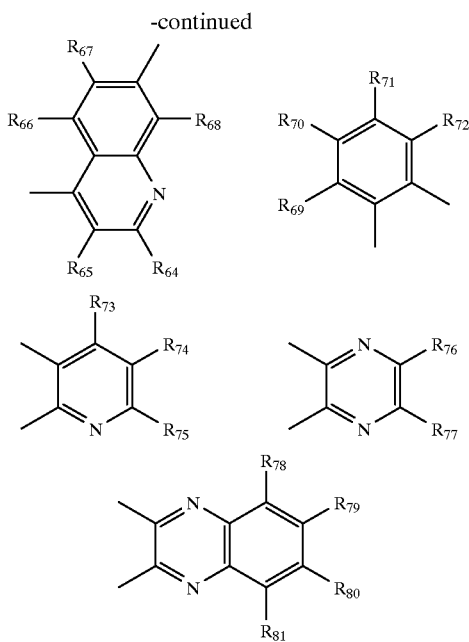

($R_8$ to $R_{99}$ independently represent a group selected from the group consisting of hydrogen, an alkyl, alkoxy and alkylthio group having 1 to 20 carbon atoms, an aryl or aryloxy group having 6 to 18 carbon atoms and a heterocyclic compound group having 4 to 14 carbon atoms).

Among them, substituted or unsubstituted phenylene, substituted or unsubstituted biphenylene, substituted or unsubstituted naphthalenediyl, substituted or unsubstituted anthracene-9,10-diyl, substituted or unsubstituted pyridine-2,5-diyl, and substituted or unsubstituted thienylene groups are preferred. Phenylene, biphenylene, naphthalenediyl, pyridine-2,5-diyl and thienylene groups are more preferred.

The case where $R_5$ and $R_6$ of the general formula (3) represent a substituent other than hydrogen or a cyano group will be described below. Examples of the alkyl group having 1 to 20 carbon atoms include methyl group, ethyl group, n-propyl group, isopropyl group, n-butyl group, sec-butyl group, tert-butyl group, pentyl group, hexyl group, heptyl group, octyl group, decyl group, lauryl group and the like. Among them, methyl, ethyl, pentyl, hexyl, heptyl and octyl groups are preferred. Examples of the aryl group include phenyl group, 4-$C_1$–$C_{12}$ alkoxyphenyl group ($C_1$–$C_{12}$ means 1 to 12 carbon atoms, and this applies in the same way to the following descriptions), 4-$C_1$–$C_{12}$ alkylphenyl group, 1-naphthyl group, 2-naphtyl group and the like.

In view of the solubility in organic solvent, it is preferred that $Ar_3$ of the general formula (3) has at least one group selected from alkyl, alkoxy or alkylthio group having 4 to 20 carbon atoms, aryl or aryloxy group having 6 to 18 carbon atoms or heterocyclic compound group having 4 to 14 carbon atoms.

Examples of these substituents include the followings. Examples of the alkyl group having 4 to 20 carbon atoms include n-butyl group, sec-butyl group, tert-butyl group, pentyl group, hexyl group, heptyl group, octyl group, decyl group, lauryl group and the like. Among them, pentyl, hexyl, heptyl and octyl groups are preferred.

Examples of the alkoxy group having 4 to 20 carbon atoms include butoxy group, pentyloxy group, hexyloxy group, heptylocy group, octyloxy group, decyloxy group, lauryloxy group and the like. Among them, pentyloxy group, hexyloxy group, heptyloxy group and octyloxy group are preferred.

Examples of the alkylthio group include butylthio group, pentylthio group, hexylthio group, heptylthio group, octylthio group, decyloxy group, laurylthio group and the like. Among them, pentylthio, hexylthio, heptylthio and octylthio groups are preferred.

Examples of the aryl group include phenyl group, 4-$C_1$–$C_{12}$ alkoxyphenyl group ($C_1$–$C_{12}$ means 1 to 12 carbon atoms), 4-$C_1$–$C_{12}$ alkylphenyl group, 1-naphthyl group, 2-naphtyl group and the like.

Examples of the aryloxy group include phenoxy group. Examples of the heterocyclic compound group include 2-thienyl group, 2-pyrrolyl group, 2-furyl group, 2-, 3- or 4-pyridyl group and the like.

The number of these substituents vary depending on the molecular weight of the polymeric fluorescent substance and construction of the repeating unit. In order to obtain a polymeric fluorescent substance having high solubility, the number of these substituents is preferably at least one per molecular weight of 600.

The polymeric fluorescent substance used for the organic EL device of the present invention may be a random block or graft copolymer, or a polymer having an intermediate construction of them, e.g. a block-type random copolymer. In order to obtain a polymeric fluorescent substance having high quantum yield of fluorescence, the block-type random copolymer, or block or graft copolymer is better than the wholly random copolymer. Since the organic EL device of the present invention utilizes light emission from a thin film, a polymeric fluorescent substance having luminescence at the solid state is used.

Examples of the good solvent to the polymeric fluorescent substance include chloroform, methylene chloride, dichloroethane, tetrahydrofuran, toluene, xylene and the like. The polymeric fluorescent substance can be normally dissolved in these solvents in the concentration of not less than 0.1% by weight, although it varies depending on the structure or molecular weight of polymeric fluorescent substance.

The molecular weight of the polymeric fluorescent substance used for the organic EL device of the present invention is preferably within the range from $10^3$ to $10^7$ calculated as polystyrene, and the polymerization degree varies depending on the construction and proportions of the repeating units. In view of film-forming properties, the total number of the repeating units is preferably within the range from 4 to 10000, more preferably from 5 to 3000, most preferably from 10 to 2000.

In the organic EL device of the present invention, when an electron transporting layer is further formed between the layer including light emitting material and negative electrode, or an electron transporting material is used together with the hole transporting material and light emitting material, the electron transporting material has a function of transferring electrons injected from the negative electrode to the light emitting material. The electron transporting material is not specifically limited, and any electron transporting material can be used by selecting from compounds which have hitherto been known.

Preferred examples of the electron transporting material include nitro-substituted fluorenone derivative, anthraquinodimethane derivative, diphenylquinone derivative, thiopyran dioxide derivative, heterocyclic tetracarboxylic anhydride, carbodiimide and the like.

Furthermore, preferred examples are fluolenylidende derivative, anthraquinodimethane derivative, anthrone derivative, oxadiazole derivative and the like. Although 8-hydroxyquinoline and a metal complex of a derivative thereof are disclosed as the material for forming the light emitting layer, they can also be used as the electron transporting material.

Next, a typical method of producing the organic EL device having a layered structure as one embodiment of the present invention will be described. As the pair of transparent or semitransparent electrodes composed of the positive electrode and negative electrode, for example, those obtained by forming a transparent or semitransparent electrode on a transparent substrate such as transparent glass, transparent plastic, etc. can be used.

As the material of the positive electrode, for example, there can be used conductive metal oxide films, semitransparent metal thin films and the like. Specifically, films made by using conductive glasses such as indium-tin oxide (ITO), tin oxide, etc. (e.g. NESA), Au, Pt, Ag and Cu are used. Examples of the producing method include vacuum deposition method, sputtering method, plating method and the like.

A hole transporting layer containing the above described polysilane is formed on this positive electrode. Examples of the forming method include a method of dissolving the polysilane in a solvent in the concentration of 1 to 30% by weight relative to the solvent to prepare a coating solution and then applying this coating solution according to a spin coating, casting, dipping, bar coating or roll coating method.

A known hole transporting material may be used in combination for the hole transporting layer unless characteristics of the polysilane of the present invention are damaged. A second hole transporting layer may be formed adjacent to the hole transporting layer containing the polysilane.

Examples of the organic solvent used for the solution include aromatic solvent such as benzene, toluene, xylene and the like; ether solvent such as diethyl ether, tetrahydrofuran and the like; and halogen solvent such as chloroform and the like.

A film thickness of the hole transporting layer is preferably within the range from 1 nm to 1 $\mu$m, more preferably from 2 to 500 nm. In order to enhance the luminous efficiency by increasing the current density, the film thickness is preferably within the range from 5 to 100 nm.

Then, a light emitting layer containing an organic dye having low molecular weight, a polymeric fluorescent substance, etc. as the fluorescent material is formed. Examples of the method of forming the light emitting layer include a method of applying a melt, a solution or a mixed solution of these materials according to a spin coating, casting, dipping, bar coating or roll coating method. It is preferred that a film is formed by applying the solution or mixed solution according to a coating method such as spin coating method, casting method, dipping method, bar coating method, roll coating method and the like.

A film thickness of the light emitting layer is preferably within the range from 1 nm to 1 $\mu$m, more preferably from 2 to 500 nm. In order to enhance the luminous efficiency by increasing the current density, the film thickness is preferably within the range from 5 to 100 nm.

When a thin film of the hole transporting layer and/or light emitting layer is formed by the application method, it is preferred to dry at the temperature within the range from 30 to 300° C., preferably from 60 to 200° C., under reduced pressure or an inert atmosphere so as to remove the solvent, after formation of the hole transporting layer and/or light emitting layer.

When an electron transporting layer is further laminated on the light emitting layer, it is preferred to form the electron transporting layer after the light emitting layer was formed by the above-described film forming method.

The method of forming the film of the electron transporting layer is not specifically limited, and there can be used vacuum deposition method from the powder state; application method such as spin coating method, casting method, dipping method, bar coating method, roll coating method, etc. after dissolving in the solution; or application method such as spin coating method, casting method, dipping method, bar coating method, roll coating method, etc. after mixing the polymeric compound with the electron transporting material in the solution or molten state, followed by dispersing.

The polymer compound mixed is not specifically limited, but those which do not drastically inhibit electron transport are preferred. Those whose absorption to visible light is not strong are preferably used.

Examples thereof include poly(N-vinylcarbazole) and a derivative thereof, poly(aniline) and a derivative thereof, poly(thiofene) and a derivative thereof, poly(p-phenylenevinylene) and a derivative thereof, poly(2,5-thienylenevinylene) and a derivative thereof, poly(carbonate) and a derivative thereof, poly(acrylate) and a derivative thereof, poly(methyl acrylate) and a derivative thereof, poly(methyl methacrylate) and a derivative thereof, poly(styrene) and a derivative thereof, poly(vinyl chloride) and a derivative thereof, poly(siloxane) and a derivative thereof and the like. It is preferred to use the coating method when using a polymer compound because a film can be easily formed.

A film thickness of the electron transporting layer must be a thickness so that no pin hole is formed. When the film thickness is too large, the resistance of the layer increase to require high driving voltage and, it is not preferred. Accordingly, the film thickness of the electron transporting layer is preferably within the range from 1 nm to 1 $\mu$m, more preferably from 2 to 500 nm, most preferably from 5 to 100 nm.

Then, an electrode is formed on the light emitting layer or electron transporting layer. This electrode serves as an electron injection electrode. The material is not specifically limited, but a material having small work function is preferred.

For example, there can be used Al, In, Mg, Ca, Li, Mg—Ag alloy, In—Ag alloy, Mg—In alloy, Mg—Al alloy, Mg—Li alloy, Al—Li alloy, graphite thin film and the like. As the method of producing the negative electrode, there can be used vacuum deposition method, sputtering method and the like.

In the organic EL device of the present invention, there is also used a method of forming an organic layer containing the hole transporting material and light emitting material or an organic layer containing the hole transporting material, light emitting material and electron transporting material on one electrode according to the same manner as that of forming the above hole transporting layer, and then forming the other electrode.

The organic EL device of the present invention shows characteristics such as higher luminance and higher luminous efficiency at lower driving voltage because the polysilane having high hole drift mobility is used for the hole transporting material. The organic EL device can be easily produced because the hole transporting layer and light emitting layer can be formed by the coating or casting method.

EXAMPLES

The following Examples further illustrate the present invention in detail but are not to be construed to limit the scope thereof.

In the following Examples, the molecular weight of the polymer, e.g. number-average molecular weight and weight-average molecular weight calculated as polystyrene, was measured by gel permeation chromatography (Waters Co., Maxima-820, column Ultrastyragel Linear: mobile phase tetrahydrofuran) (sometimes referred to hereinafter as GPC). Structure analysis was conducted using $^1$H, $^{13}$C-NMR (Bruker Co., Model AC200P). The hole drift mobility was measured by a known method such as standard time-of-flight method (published by Joseph Mort & D. Pai, Photoconductivity and Related Phenomena (New York, 1976), page 27–69).

Synthesis Example 1

Synthesis of Ethyl (N,N-diphenylaminophenyl) Dichlorosilane

In the following Examples, the reaction is conducted under a dried argon atmosphere according to the method known as a Schlenk's method unless otherwise stated. To a 100 ml two neck flask which was dried at 200° C., composed in the hot state, cooled under vacuum and filled with dried argon, 4.7 g of (4-N,N-diphenylamino)bromobenzene was charged, and then melted and dried under vacuum. After 20 ml of dried tetrahydrofuran distilled on sodium just before the addition was added to dissolve (4-N,N-diphenylamino) bromobenzene, after which 9.4 ml of n-butyl lithium (Aldrich Co., 1.6 N hexane solution) was added into the solution at −78° C. and the resulting mixture was subjected to reaction for 1 hour to produce (4-N,N-diphenylamino) phenyllithium.

To a 100 ml two neck flask dried in the same manner as that described above, 3.4 g of ethyltrichlorosilane (manufactured by Shinetsu Kagaku Co.,Ltd., LS-120) distilled on calcium hydride just before the addition and 15 ml of dried tetrahydrofuran were charged and, after cooling to −78° C., the above-described (4-N,N-diphenylamino) phenyllithium was added using a cannula. After completion of the addition, the resulting mixture was subjected to reaction for 1 hour at −78° C. and stirred overnight at the room temperature and the excess ethyltrichlorosilane and solvent were removed by distillation, after which the residue was subjected to vacuum distillation by use of Kugelrohr, to obtain 2.8 g of ethyl(N,N-diphenylaminophenyl) dichlorosilane.
Data of Structure Analysis (NMR)

| $^1$H-NMR | |
| --- | --- |
| 0.97–1.06 ppm (3H) | C$\underline{H_3}$CH$_2$—Si |
| 1.12–1.25 ppm (2H) | CH$_3$C$\underline{H_2}$—Si |
| 6.90–7.40 ppm (12 lines: 14H) | (C$_6$H$_5$)$_2$N(C$_6$H$_4$)—Si |
| (Dioxane 3.57 ppm standard) | |
| $^{13}$C-NMR | |
| 6.4 ppm | C$\underline{H_3}$CH$_2$—Si |
| 13.3 ppm | CH$_3$C$\underline{H_2}$—Si |
| 121–151 ppm (8 lines) | (C$_6$H$_5$)$_2$N(C$_6$H$_4$)—Si |
| (Chloroform-d 77.1 ppm standard) | |

Synthesis Example 2

Synthesis and Evaluation of Polysilane

To 50 ml of a three neck flask dried at 200° C., a rubber septum and an argon seal were charged and then cooled with repeating evacuation and filling of dried argon. To this flask, 0.7 g of metal sodium was added under a dried nitrogen atmosphere and 16 ml of toluene, which was dried on sodium and distilled just before the addition was added. This flask was set to an ultrasonic disperser (manufactured by Branson Co., Model 450) under a dried argon flow, and then an ultrasonic wave was applied with heating at 100–105° C. to disperse sodium in an average particle size of 50 μm. After completion of the dispersion, the flask was allowed to stand and 12 ml of excess toluene as a supernatant was removed using a syringe.

A 50 ml three neck flask which was dried in the same manner as that described above was equipped with a magnetic stirrer, a thermocouple and a rubber septum, and then 4.9 g of ethyl(N,N-diphenylaminophenyl)dichlorosilane synthesized in the same manner as that described in Synthesis Example 1 and 4 ml of dried toluene were added to form a solution. After this flask was heated to 80° C., the above sodium dispersion was added over about 10 minutes using a cannula. The temperature in the flask was increased temporarily to 120° C. by the heat of reaction. The reaction has been conducted for 4 hours.

After completion of the reaction, 20 ml of toluene and 3 ml of isopropyl alcohol were added to the flask under an argon flow to deactivate excess metal sodium. Then, about 10 ml of distilled water was added to dissolve a violet precipitate. The precipitate was separated by a centrifugal separating operation and washed twice with toluene, and then a soluble matter was recovered as a toluene solution. After the toluene solution was washed with water and dried over anhydrous magnesium sulfate, the solvent was distilled off to obtain a glassy substance. This glassy substance was dissolved in tetrahydrofuran, and then the resulting solution was repeatedly subjected to reprecipitaion from isopropyl alcohol, to obtain 0.24 g of a purified polymer.

The molecular weight distribution of the polymer obtained was measured by GPC and it was as a result confirmed that a high molecular weight polysilane was obtained. The results of NMR and elementary analysis corresponded to poly(ethyl(N,N-diphenylaminophenyl) silane).
Data of Structure Analysis (NMR)

| $^1$H-NMR | |
| --- | --- |
| −0.6–0.6 ppm (5H) | C$\underline{H_3}$C$\underline{H_2}$—Si |
| 6.6–7.2 ppm (14H) | (C$_6$H$_5$)$_2$N(C$_6$H$_4$)—Si |

| Elemental analysis (% by weight) | | | | |
| --- | --- | --- | --- | --- |
| | Si | C | H | N |
| Found value | 8.2 | 80.0 | 6.4 | 4.7 |
| Expected value | 9.3 | 80.0 | 6.4 | 4.6 |

Molecular Weight
Weight-average molecular weight=$1.1 \times 10^6$;
Number-average molecular weight=$7.3 \times 10^3$
Evaluation of Hole Drift Mobility The polysilane (0.1 g) synthesized as described above was dissolved in 1.9 g of dried toluene to form a 5% by weight toluene solution of polysilane. This toluene solution was filtered through a membrane filter (0.2 μm) to form a coating solution. On a charge generating layer formed by amorphous selenium in a film thickness of 0.2 μm on a glass substrate, on which a transparent conductive film (ITO) was built up, according to a vacuum deposition method, this coating solution was applied in a film thickness of 5.8 μm according to a spin coating method to form a polysilane hole transporting layer. Furthermore, a gold electrode was deposited on the polysilane hole transporting layer according to the vacuum deposition method and the resultant was taken as a sample for measuring the hole drift mobility according to time-of-flight method.

A flash light (wavelength: 481 nm, flashing time: 1 nsec) was exposed to this sample from the transparent electrode side using a nitrogen laser-excited dye laser (manufactured by Laser Photonics Co., nitrogen laser/dye laser, Model LN1000/LN102) and the hole drift mobility was measured by a conventional time-of-flight method. A digitizing oscilloscope (manufactured by Hewlett Packard Co., Model 54710A/54713A) was used for the measurement of a photocurrent. As a result, the hole drift mobility of $3 \times 10^{-3}$ $cm^2/V/sec$ was obtained at room temperature under an applied voltage of 290 V (electric field strength: 0.5 MV/cm).

Example 1

Production and Evaluation of Organic EL Device

On a glass substrate on which an ITO film was built up in a thickness of 40 nm according to a sputtering method, a film was formed in a thickness of 80 nm using a 2% by weight toluene solution of the polysilane synthesized in Synthesis Example 2 according to a spin coating method to form a hole transporting layer. After drying under reduced pressure at 120° C. for 1 hour, tris(8-quinolinol)aluminum ($Alq_3$) as the light emitting layer was deposited in a thickness of 50 nm on the hole transporting layer. Finally, an aluminum-lithium alloy [Al:Li=99:1 (weight ratio)] as the negative electrode was deposited in a thickness of 200 nm on the light emitting layer to produce an organic EL device having a two-layer structure. The vacuum degree on deposition was not more than $8 \times 10^{-6}$ Torr.

A voltage of 18 V was applied to this organic EL device. As a result, a current having a current density of 50 $mA/cm^2$ flowed and emission of yellow-green EL light having a luminance of 1310 $cd/m^2$ was observed. At this time, the luminous efficiency was 2.6 cd/A. The EL peak wavelength was 520 nm and it nearly agreed with a fluorescent peak wavelength of an $Alq_3$ thin film.

Example 2

Production and Evaluation of Organic EL Device

According to the same manner as that described in Example 1, a film was formed on a glass substrate, on which an ITO film was built up, in a thickness of 80 nm, using a 2% by weight toluene solution of the polysilane synthesized in Synthesis Example 2 according to a spin coating method. After drying under reduced pressure at 120° C. for 1 hour, tris(8-quinolinol)aluminum ($Alq_3$) as the light emitting layer was deposited in a thickness of 50 nm. Then, 2,5-diphenyl-1,3,4-oxadiazole (PBD) as the electron transporting layer was deposited in a thickness of 50 nm on the light emitting layer. Finally, an aluminum-lithium alloy [Al:Li=99:1 (weight ratio)] as the negative electrode was deposited in a thickness of 200 nm on the light emitting layer to produce an organic EL device having a three-layer structure. The vacuum degree on deposition was not more than $8 \times 10^{-6}$ Torr.

A voltage of 18 V was applied to this organic EL device. As a result, a current having a current density of 39 $mA/cm^2$ flowed and emission of yellow-green EL light having a luminance of 1750 $cd/m^2$ was observed. At this time, the luminous efficiency was 4.4 cd/A. The EL peak wavelength was 520 nm and it nearly agreed with a fluorescent peak wavelength of an $Alq_3$ thin film.

Synthesis Example 3

According to the same manner as that described in Synthesis Example 2, 1.3 g of sodium was taken in a dried three neck flask and 19 ml of dried toluene was added. An ultrasonic wave was applied to this flask under an argon flow to disperse sodium in an average particle size of not more than 50 $\mu$m. After heating to 62° C., 5.0 g of methylphenyldichlorosilane distilled just before adding (Shinetsu Kagaku Co., Ltd., LS-1490) was added using a syringe. After the completion of the addition, the temperature in the flask was increased temporarily to 110° C. by heat of the reaction and reflux of the solvent was recognized. Immediately after the completion of the addition, the flask was heated to 85° C. and the reaction was further conducted for 40 minutes. After completion of the reaction, a polymer was purified according to the same manner as that described in Synthesis Example 2 to obtain 0.8 g of poly (methylphenylsilane).

Data of Structure Analysis (NMR)

| $^1$H-NMR | |
|---|---|
| –1.2–0.3 ppm (3H) | $\underline{CH_3}$—Si |
| 6.0–7.4 ppm (5H) | $\underline{C_6H_5}$—Si |

| Elemental analysis (% by weight) | | | | |
|---|---|---|---|---|
| | Si | C | H | N |
| Found value | 22.0 | 69.0 | 6.9 | <0.3 |
| Expected value | 23.0 | 70.0 | 6.7 | 0 |

Molecular Weight
Weight-average molecular weight=$2.3 \times 10^5$;
Number-average molecular weight=$6.2 \times 10^3$ Evaluation of Hole Drift Mobility According to the same manner as that described in Synthesis Example 2, a sample for measuring the hole drift mobility having a film thickness of 4.0 $\mu$m was made by using the polysilane synthesized in Synthesis Example 3. Then, the hole drift mobility was measured by the time-of-flight method at room temperature under an applied voltage of 200 V (electric field strength: 0.5 MV/cm). As a result, the hole drift mobility of $2 \times 10^{-4}$ $cm^2/V/sec$ was obtained.

Comparative Example 1

Production and Evaluation of Organic EL Device

According to the same manner as that described in Example 1 except for using the polysilane synthesized in Synthesis Example 3 in place of that synthesized in Synthesis Example 2, an organic EL device having a two-layer structure was produced. A voltage of 20 V was applied to the resulting organic EL device. As a result, a current having a current density of 14 $mA/cm^2$ flowed and emission of yellow-green EL light having a luminance of 340 $cd/m^2$ was observed. At this time, the luminous efficiency was 2.4 cd/A. The EL peak wavelength was 520 nm and it nearly agreed with a fluorescent peak wavelength of an $Alq_3$ thin film.

Comparative Example 2

Production and Evaluation of Organic EL Device

According to the same manner as that described in Example 2 except for using the polysilane synthesized in Synthesis Example 3 in place of that synthesized in Synthesis Example 2, an organic EL device having a three-layer structure was produced. A voltage of 20 V was applied to the resulting organic EL device. As a result, a current having a current density of 16 mA/cm² flowed and emission of yellow-green EL light having a luminance of 620 cd/m² was observed. At this time, the luminous efficiency was 3.9 cd/A. The EL peak wavelength was 520 nm and it nearly agreed with a fluorescent peak wavelength of an Alq₃ thin film.

Synthesis Example 4

Synthesis of Polymeric Fluorescent Substance 2,5-Dioctyloxy-p-xylilene dibromide was reacted with triphenylphosphine in a N,N-dimethylformamide to synthesize a phosphonium salt. The mixture of 47.75 parts by weight of the resulting phosphonium salt and 6.7 parts by weight of terephthalaldehyde were dissolved in ethyl alcohol. An ethyl alcohol solution containing 5.8 parts by weight of lithium ethoxide was added to an ethyl alcohol solution of the phosphonium salt and dialdehyde, and the mixture was polymerized at room temperature for 3 hours. After the reaction solution was allowed to stand at room temperature overnight, the precipitate was removed by filtration. The filtrate was washed with ethyl alcohol and dissolved in chloroform, and then ethanol was added to the solution to form a precipitate again. The precipitate was dried under reduced pressure to obtain 8.0 parts by weight of a polymer. This polymer is referred to as a polymeric fluorescent substance 1. The repeating units of the polymeric fluorescent substance 1 calculated from the charge ratio of monomers and molar ratio thereof are shown below.

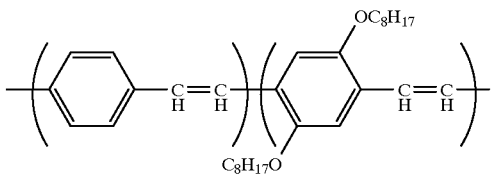

The molar ratio of two repeating units is 1:1 and two repeating units bond each other.

The number-average molecular weight calculated as polystyrene of the polymeric fluorescent substance 1 was 1.0× 10⁴. The structure of the polymeric fluorescent substance 1 was confirmed by infrared absorption spectrum and NMR.

Example 3

On a glass substrate on which an ITO film was built up in a thickness of 40 nm according to a sputtering method, a film was formed in a thickness of 140 nm using a toluene solution containing 0.9% by weight of the polysilane obtained in Synthesis Example 1 and 2.1% by weight of the polymeric fluorescent substance 1 synthesized in Synthesis Example 4 according to a spin coating method. Then, tris(8-quinolinol) aluminum (Alq₃) was deposited in a thickness of 40 nm as the electron transporting layer. Finally, an aluminum-lithium alloy [Al:Li=99:1 (weight ratio)] as the negative electrode was deposited in a thickness of 130 nm thereon to produce an organic EL device. The vacuum degree on deposition was not more than 8×10⁻⁶ Torr.

A voltage of 10 V was applied to this organic EL device. As a result, a current having a current density of 230 mA/cm² flowed and emission of yellow-green EL light having a luminance of 2626 cd/m² was observed. At this time, the luminous efficiency was 1.2 cd/A. The luminance was nearly proportional to the current density. The EL peak wavelength was 545 nm and it nearly agreed with a fluorescent peak wavelength of a polymeric fluorescent substance 1 thin film. Emission of EL light from the polymeric fluorescent substance 1 was confirmed.

Example 4

Production and Evaluation of Organic EL Device

On a glass substrate on which an ITO film was built up in a thickness of 40 nm according to a sputtering method, a film was formed in a thickness of 120 nm using a 1.5% by weight toluene solution of the polysilane synthesized in Synthesis Example 2 according to the spin coating method to form a hole transporting layer. Furthermore, a film was formed in a thickness of 40 nm using a 1.0% by weight toluene solution of the polymeric fluorescent substance 1 synthesized in Synthesis Example 4 according to a spin coating method to form a light emitting layer. After drying under reduced pressure at 120° C. for 1 hour, tris(8-quinolinol)aluminum (Alq₃) was deposited in a thickness of 40 nm as the electron transporting layer. Finally, an aluminum-lithium alloy [Al:Li=99:1 (weight ratio)] as the negative electrode was deposited in a thickness of 110 nm on the electron transporting layer to produce an organic EL device having a three-layer structure.

The vacuum degree on deposition was not more than 8×10⁻⁶Torr.

A voltage of 8 V was applied to this organic EL device. As a result, a current having a current density of 54 mA/cm² flowed and emission of EL light having a luminance of 1320 cd/m² was observed. At this time, the luminous efficiency was 2.4 cd/A. The EL peak wavelength was 545 nm and it nearly agreed with a fluorescent peak wavelength of a polymeric fluorescent substance 1 thin film. Emission of EL light from the polymeric fluorescent substance 1 was confirmed.

Since the organic EL device using the polysilane having high hole drift mobility for the hole transporting material of the present invention can be easily produced and has high current transporting capability, it shows excellent characteristics such as higher luminance and higher luminous efficiency at lower driving voltage. Accordingly, it can be preferably used as a flat light source for backlight of liquid crystal display or a display device such as flat panel display and the like.

What is claimed is:

1. An organic electroluminescence device comprising a pair of electrodes, at least one of which is transparent or semitransparent, and at least one organic layer formed between the electrodes, the organic layer containing a hole transporting material and a light emitting material in the same or different layer, wherein the hole transporting material contains at least one polysilane whose main chain skeleton is composed of a repeating unit represented by the following general formula (1):

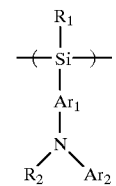

wherein $R^1$ and $R^2$ independently represent a substituted or unsubstituted alkyl group, a substituted or unsubstituted cycloalkyl group, a substituted or unsubstituted aryl group, or a substituted or unsubstituted aralkyl group, $Ar_1$ represents a substituted or unsubstituted arylene group and $Ar_2$ represents a substituted or unsubstituted aryl group and a repeating unit represented by the following general formula (2):

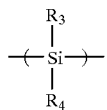

wherein $R_3$ and $R_4$ independently represent a substituted or unsubstituted alkyl group, a substituted or unsubstituted cycloalkyl group, a substituted or unsubstituted aryl group, or a substituted or unsubstituted aralkyl group, and the polysilane satisfying the expression $0.2 \leq z \leq 1$ where a ratio of the number of the repeating unit (1) and that of the repeating unit (2) to the total number of repeating units (1) and (2) are z and 1−z, respectively, the polysilane having a weight-average molecular weight of not less than 5000 and a hole drift mobility of $10^{-3}$–$10^{-1}$ cm$^2$/v/sec.

2. The organic electroluminescence device according to claim 1, wherein a polysilane of the general formula (1) in which $R_2$ is a substituted or unsubstituted phenyl group, $Ar_1$ is a substituted or unsubstituted phenylene group and $Ar_2$ is a substituted or unsubstituted phenyl group is used.

3. The organic electroluminescence device according to claim 1 or 2, comprising a pair of electrodes, at least one of which is transparent or semitransparent, and at least one organic layer formed between the electrodes, the organic layer containing a hole transporting material and a light emitting material in the same or different layer, wherein the organic layer contains, as the light emitting material, at least one kind of a polymeric fluorescent substance which has fluorescence in the solid state and contains at least one kind of a repeating unit represented by the following formula (3):

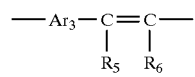

(wherein $Ar_3$ represents an arylene group having 4 to 20 carbon atoms, which takes part in a conjugated bond, or a heterocyclic compound group, and $R_5$ and $R_6$ independently represent a group selected from the group consisting of hydrogen, an alkyl group having 1 to 20 carbon atoms, an aryl group having 6 to 20 carbon atoms, a heterocyclic compound group having 4 to 20 carbon atoms and a cyano group), the sum of the above repeating units being not less than 50% by mol of the total number of the repeating units, a number-average molecular weight of the polymeric fluorescent substance being $10^3$–$10^7$.

4. The organic electroluminescence device according to claim 1, wherein a hole transporting layer containing at least one kind of the polysilane of claim 1 or 2 and a light emitting layer are laminated each other.

5. The organic electroluminescence device according to claim 1, wherein a hole transporting layer containing at least one kind of the polysilane, a light emitting layer and an electron transporting layer are laminated.

6. The organic electroluminescence device according to claim 1, comprising at least one organic layer which contains a hole transporting material containing at least one kind of the polysilane and a light emitting material.

7. The organic electroluminescence device according to claim 1, comprising at least one organic layer which contains a hole transporting material containing at least one kind of the polysilane, a light emitting material and an electron transporting material.

* * * * *